June 9, 1942.  P. M. COOK  2,285,495
PAN GREASING DEVICE
Filed Feb. 13, 1939
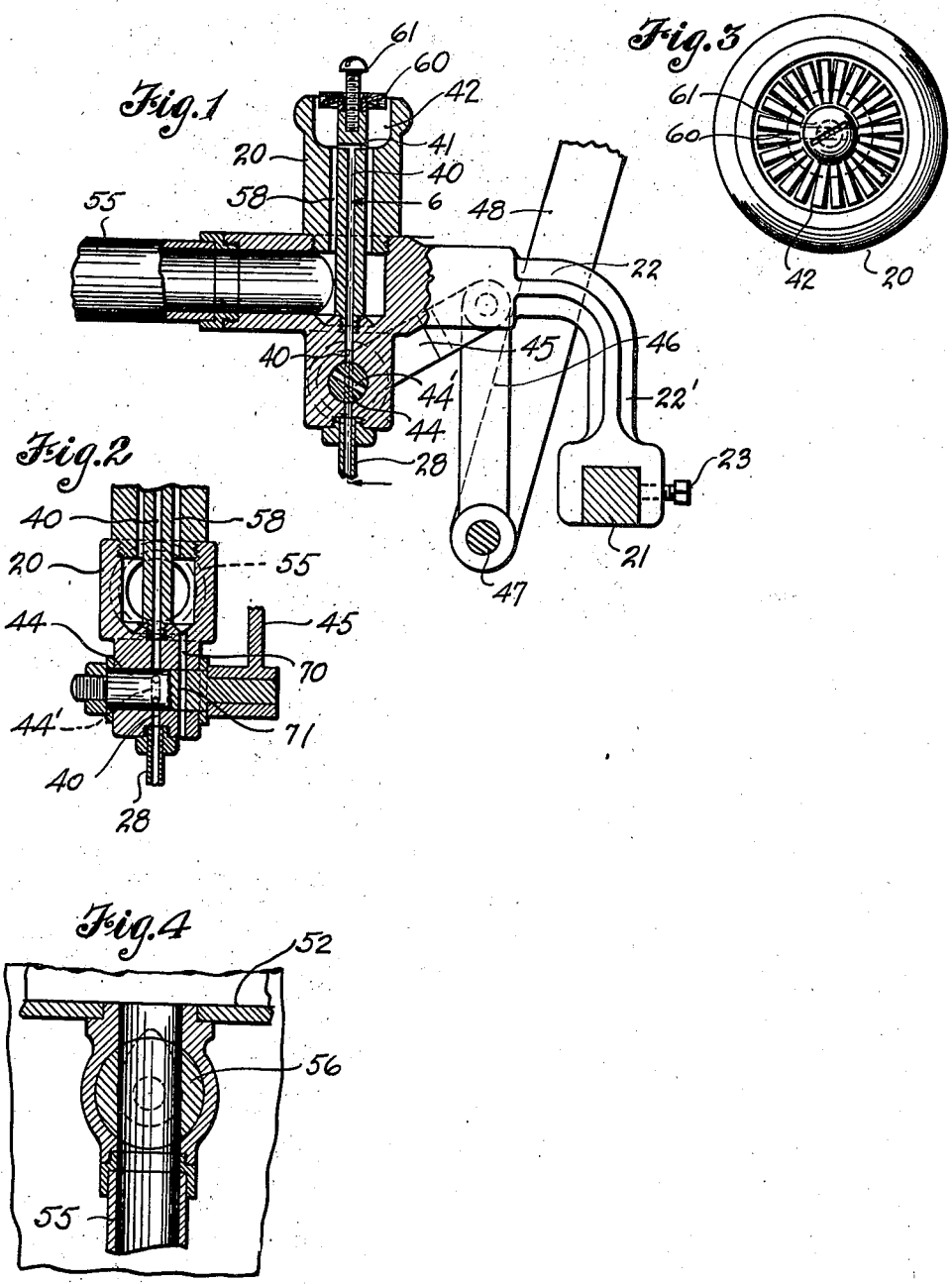
INVENTOR
PEARL M. COOK
BY
Cook & Robinson
ATTORNEY Patented June 9, 1942

2,285,495

UNITED STATES PATENT OFFICE 2,285,495

PAN GREASING DEVICE

Pearl M. Cook, Seattle, Wash.

Application February 13, 1939, Serial No. 256,209

3 Claims. (Cl. 299—140)

This invention relates to improvements in mechanical means for greasing pans as used in bakeries, or similar places, for the baking of bread therein; it being the principal object of this invention to improve upon the apparatus disclosed in U. S. Patent No. 1,522,867, issued to Pearl Cook et al., on January 13, 1925.

More specifically stated, the objects of this invention are to be found in the novel details of construction of the grease delivery valve and the association therewith of a grease atomizing impeller of novel form and operable by a delivery of air to the valve.

Fig. 1 is an enlarged, cross sectional detail of an oil delivery and atomizing valve embodying the present invention.

Fig. 2 is a cross sectional detail of the same.

Fig. 3 is an enlarged top view of the valve, particularly illustrating the grease atomizing disk thereon.

Fig. 4 is a sectional detail of the air cut-off valve.

Referring more in detail to the drawing—

The present grease delivery valve comprises a valve body 20, and this is equipped with a lateral bracket 22, formed with a down-turned end portion 22' having an end notch that fits a supporting bar 21. A set screw 23, in the bracket, may be tightened against the bar 21 to hold the valve in fixed position.

Grease is supplied to the lower end of the valve housing 20 through a conduit 28. This connects with the lower end of a vertical channel 40 centrally through the housing and opening at its upper end with a plurality of radial ports 41 into a cup or basin 42 at the upper end of the valve housing.

Extended through the lower end portion of each valve housing 20 is a rotary valve plug 44 controlled by a lever arm 45 fixed to its outer end. This is connected at its outer end by a link 46 with a cross rod 47. The cross rod 47 is fixedly suspended by a bar 48. When the bar is actuated downwardly, the lever 45 will be actuated accordingly to rotate the valve plug 44 to open positions for the discharge of grease through the vertical channels 40. On this actuation of the valve plug 44 to open position, channel 44' therein is caused to register with channel 40 and grease is discharged into the basins 42 of the several valves and is then atomized by sudden delivery of air upwardly through the cups. Air is supplied from a container, under pressure, to the valve 20 through a conduit 55 which is equipped as in Fig. 4 with a control valve 56, to be operated between open and closed positions by any suitable means coincidently with the opening and closing of the valve by the plug 44.

The conduit 55 opens into the valve 20, into an annular, upwardly directed channel 58 that discharges upwardly into the valve basin 42, as noted in Fig. 1; thus, when a blast of air is delivered into the basin simultaneously with the delivery of the oil thereinto, the latter will be discharged upwardly with the air. To facilitate the complete atomization and distribution of the grease discharged by the valve, I have disposed a revolubly mounted disk 60 horizontally within the mouth or top of the basin 42, and the disk is radially bladed, and the blades are so inclined that the blast of air will cause the disk to spin and thus to atomize and spread the grease delivered with the air over the pan surface; it being understood that the upper end of the valve would be located directly beneath the pan to be greased.

As a feature of the construction, the disk is revoluble on a headed screw 61 threaded centrally into the cup. Normally, the disk rests substantially even with the top of the cup, but when a blast of air and grease is discharged, it is free to move up the screw in accordance with the air pressure, and to settle back into the mouth of the cup when the pressure is diminished.

It will be explained here that grease that may be left in the valve basins 42 on cutting off the air delivery and on closing the valves by rotation of plugs 44 to the position seen in Fig. 1, may be drained out through a channel 70, as seen in Fig. 2; it being noted that this channel leads from the base of the vertical passage 58 through the base of the valve 20 and that a passage 71 is provided in the plug 44 to register therewith when the valve plug is in its closed position.

Having thus described my invention, what I claim as new therein and desire to secure by Letters Patent is—

1. A grease atomizing and spraying device comprising a valve housing formed at its top end with an upwardly opening basin of substantial depth, and having a valve controlled passage leading to the base of the basin for the delivery of grease thereto, and having a valve controlled channel for the delivery of air under pressure into the basin for the dispersion of the grease therefrom, and an atomizing and spraying disk contained within the upper portion of the basin and adapted to be revolved by the impingement of the discharged air and a vertical pivot axis mounting the disk and along which it will be lifted from the basin in accordance with the delivery of air.

2. A grease atomizing and spraying device comprising a valve housing formed at its top end with a circular basin of substantial depth and having a valve controlled passage leading to the base of the basin for the delivery of grease thereinto and a valve controlled channel for the delivery of air under pressure into the basin for dispersion of the grease, a vertical axial member fixed in the basin and extending beyond its top end, and an atomizing and spraying disk revolubly mounted on the said axial member normally within the basin and adapted to be lifted to a limited extent by the air in its dispersion of grease from position within the basin to a level above the same and having blades thereon to be impinged by the delivered air to cause the disk to spin while lifted and whereby the grease will be atomized and dispersed in a fine spray.

3. A device as recited in claim 2 wherein the air delivery channel leading into the base of the basin is in annular form, and wherein the grease delivery channel is located centrally of the annular channel and has a plurality of radially directed outlets into the basin and directed across the air delivery channel.

PEARL M. COOK.